United States Patent
Yamauchi et al.

(10) Patent No.: US 6,549,909 B1
(45) Date of Patent: Apr. 15, 2003

(54) INFORMATION PROCESSING APPARATUS AND A METHOD

(75) Inventors: Yasunobu Yamauchi, Kanagawa-ken (JP); Akira Morishita, Tokyo (JP); Naoko Umeki, Kanagawa-ken (JP); Miwako Doi, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/153,904

(22) Filed: Sep. 16, 1998

(30) Foreign Application Priority Data

Sep. 17, 1997 (JP) .............................................. 9-252166

(51) Int. Cl.⁷ .............................................. G06F 17/00
(52) U.S. Cl. ....................................... 707/102; 348/708
(58) Field of Search ... 707/1–206; 375/204.15–240.24; 348/65–108; 382/236–238

(56) References Cited

U.S. PATENT DOCUMENTS 6,366,615 B2 * 4/2002 Kato ...................... 375/240.14
6,415,055 B1 * 7/2002 Kato .......................... 382/236
6,559,447 * 10/2002 Okada et al. ................. 348/65

OTHER PUBLICATIONS

Lu, CSO/CTB performances improvement by using optical VSB modulation technique, IEEE Photonics Technology Letters, vol. 14, Issue 10, Oct. 2002, pp. 1478–1480.*

Lin et al., Analysis of ATSC field test results in Taiwan, Broadcasting, IEEE Transactions on, vol. 48, Issue 1, Mar. 2002, pp. 38–43.*

Freeman et al., Example–based super–resolution, IEEE Computer Graphics and Applications, vol. 22, Issue 2, Mar.–Apr. 2002, pp. 56–65.* www.compguy/com/cwtip05.htm, Clarion for Windows Tip, Oct., 1996.*

* cited by examiner

*Primary Examiner*—David Jung
(74) *Attorney, Agent, or Firm*—Oblon, Spivak, McClelland, Maier & Neustadt, P.C.

(57) ABSTRACT

An information processing apparatus is connected to a plurality of application devices. A memory section in the information processing apparatus stores, by unit of object corresponding to the application equipment, an input data type for each object and output data type for each object. The user indicates a first object as a serving side object and a second object as a receiving side object from among the plurality of the objects through an indication section. A retrieval section retrieves a third object whose input data type is the output data type of the first object and whose output data type is the input data type of the second object from the memory section, if the output data type of the first object is different from the input data type of the second object. A control section assigns the third object between the first object and the second object as a relay object.

23 Claims, 10 Drawing Sheets

| OBJECT ID | ABSTRACT FUNCTION NAME | ACTIVE FUNCTION | INPUT DATA TYPE | OUTPUT DATA TYPE | COST |
|---|---|---|---|---|---|
| MONITOR# 1 | "On" | *Monitor#1:on | . . . | . . . | 1 |
| | "Line" | *Monitor#1:on; *Monitor#1:line | VIDEO:NTSC | VIDEO:NTSC | 3 |
| VIDEO#1 | "On" | *Video#1:on | . . . | . . . | 1 |
| | "Play" | *Video#1:on; *Video#1:play | . . . | VIDEO:NTSC | 3 |
| | "Record" | *Video#1:on; *Video#1:record | VIDEO:NTSC | VIDEO:NTSC | 10 |
| | "Line1" | *Video#1on; *Video#1:line1 | VIDEO:NTSC | VIDEO:NTSC | 5 |
| TUNER#1 | "On" | *Tuner#1:on | . . . | AUDIO: STEREO | 1 |
| | "Tune Up" | *Tuner#1:on; *Tuner#1:tuneup | . . . | AUDIO: STEREO | 3 |
| | "Tune Down" | *Tuner#1:on; *Tuner#1:tunedown | . . . | AUDIO: STEREO | 3 |

CONTINUED FROM FIG.3A

| BITMAP#1 | ... | ... | ... | IMAGE : BMP | 0 |
| --- | --- | --- | --- | --- | --- |
| SCAN_CONVERTER | "transform" | *ScanConv : transform | IMAGE : BMP | VIDEO : NTSC | 1 |
| IMGVIEW#1 | "show" | *ImgView#1 : show | IMAGE : BMP<br>IMAGE : RGB | IMAGE : BMP<br>IMAGE : RGB | 1 |
| IMGEDIT#1 | "edit" | *ImgEdit#1 : edit | IMAGE : BMP<br>IMAGE : RGB<br>IMAGE : TIF | IMAGE : BMP<br>IMAGE : RGB<br>IMAGE : TIF | 1 |

*FIG. 3B*

| TYPE NAME | DOCUMENT | SOUND | STILL IMAGE |
|---|---|---|---|
| TYPE VALUE | D O C | SOUND | IMAGE |
| FORMAT NAME | GENERAL TEXT | PCM SOUND SOURCE | RGBFormat |
| FORMAT VALUE | T X T | P C M | R G B |
| FORMAT NAME | MS WORD DOCUMENT | WAVE SOUND SOURCE | Bitmap |
| FORMAT VALUE | D O C | WAVE | BMP |
| FORMAT NAME | · · · | MIDI SOUND SOURCE | T I F F |
| FORMAT VALUE | · · · | M I D I | T I F |
| TYPE NAME | DYNAMIC IMAGE | VIDEO | AUDIO |
| TYPE VALUE | MOVIE | VIDEO | AUDIO |
| FORMAT NAME | MOTION JPEG | NTSC | NOMORAL |
| FORMAT VALUE | MJPEG | NTSC | M O N O |
| FORMAT NAME | MPEG1 | PAL | STEREO |
| FORMAT VALUE | MPEG1 | PAL | STEREO |
| FORMAT NAME | MPEG2 | · · · | · · · |
| FORMAT VALUE | MPEG2 | · · · | · · · |

*FIG. 4*

INFORMATION PROCESSING APPARATUS AND A METHOD

FIELD OF THE INVENTION

The present invention relates to an information processing apparatus and a method to smoothly execute data transmission and data processing between a plurality of objects according to consistency of the data type.

BACKGROUND OF THE INVENTION

Through the spread of personal computers, application programs such as document processing, drawing processing, and table-calculation processing are widely used. In proportion to this use, an environment to execute data transmission between different application programs, or to mutually call the application program is arranged. For example, when inserting a drawing into a document, the drawing processing application is activated in the document processing application and the drawing is created. When inserting a table into a document, the table-calculation processing application is activated in the document processing application and the table is created. In an edited drawing or table, a predetermined application is registered as link information. Therefore, by activating the predetermined application automatically, editing is executed.

However, in case the drawing created by one image-processing application is inserted into a document and edited by another image-processing application, the following problem occurs. First, the format of the drawing processed by the image-processing application is limited. For example, assume that the format of the drawing processed by the image-processing application is bit map image format ("xxx. bmp") or TIFF (Tag Image File Format) format ("xxx. tif"). However, assume that the drawing is already created in a different format (for example, "aaa. wmf") which is not compatible with above-format. In this case, if the drawing format "wmf" is not converted to the format "bmp" or "tif", the drawing is not edited by the image-processing application. In other words, if the user does not know an application to convert from a "wmf" to "bmp" or "tif" format, the drawing format is not converted. Even if the conversion application exists in the computer, the user can not know which conversion program ("bmp" or "tif") has the resolution of the inserted drawing.

The same problem occurs in connection with home electric equipment. In case of AV (Audio Visual) equipment, each piece of equipment must be connected by a cable as one to one. Additionally, a predetermined connection interface is necessary. For example, in case of a connection to NTSC standard television, a video signal based on NTSC standard must be sent to a video input terminal and the equipment connectable to this video input terminal is limited to the NTSC standard video. However, various kinds of equipment such as video camera and PC except for the video have been recently used. In proportion to the various kinds of equipment, different video standard exists. For example, the normal output of PC is RGB (red, green, blue) which is different from the NTSC standard. Furthermore, various screen sizes are used as output (RGB) of a PC (Personal Computer) (In case of VGA, 640 (dot)×480 (dot) is used. In case of XVGA, 1600 (dot)×1200 (dot) is used.). The number of color per one dot is different (from 256 colors to 1670 million full colors). Furthermore, a high-definition (HD) standard is adopted for television (A number of scan line of NTSC is 640×480 while a number of HD is 1125×960).

Accordingly, if the video signal of HD is outputted through an NTSC TV screen, a down-converter to decrease the number of scan lines is necessary. Conversely, if the video signal of NTSC is outputted through a HD TV screen, an up-converter to increase the number of scan lines is necessary. In short, if the video signals of different video standard equipment is outputted through an NTSC standard TV screen, these equipment must be linked together. When inserting a medium converter, the equipment and the medium converter must be connected by cable in order. This is troublesome for the user.

In DVD on sale recently, in order to store a large quantity of data, the NTSC video signal is encoded by a standard "MPEG 2" and memorised. Therefore, in case of display, the encoded signal is decoded as an NTSC signal and outputted. The encoded standard "MPEG 2" is used when transmitting the video signal on a network. However, for example, if the video signal of MPEG 2 sent through the network is displayed by an "Web Browser" application such as Netscape or Internet Explorer, the decode function of MPEG 2 is necessary in the PC. In this case, a fast decode function equipped in the DVD player is not used in the PC. Therefore, the user must buy a decoding application or a decoding board for installation in the PC.

As mentioned-above, in the prior computer, data transmission between different data type objects is not taken into account. In a predetermined application program, a file of the application format is only read or a file of another format is only read under several restrictions. Additionally, the convertion function must be previously prepared for each application, and the type of the conversion function is limited. Even if a plurality of application programs to interpret are installed in the PC, the data processed by each program are only connected by a single static link. In case of use of another application, this application program must be activated. In this way, in the prior apparatus, data processing of different data types is not smoothly executed between a plurality of application programs.

SUMMARY OF THE INVENTION

It is an object of the present invention to provide an information processing apparatus and a method to smoothly execute the data processing between a plurality of applications according to consistency of the data type.

According to the present invention, there is provided an information processing apparatus connected to a plurality of application equipment, comprising: a memory means for storing, by unit of object corresponding to the application equipment, input data type applicable in each object and output data type supplied to other object; an indication means for indicating a first object as a serving side object and a second object as a receiving side object in a plurality of the objects; a retrieval means for retrieving a third object whose input data type is output data type of the first object and output data type is input data type of the second object from said memory means, if the output data type of the first object is different from the input data type of the second object; and a control means for assigning the third object between the first object and the second object as a relay object.

Further in accordance with the present invention, there is also provided an information processing apparatus connected to a plurality of application equipment, comprising: a memory means for storing, by unit of object corresponding to the application equipment, input data type applicable in each object and output data type supplied to other object; an indication means for indicating a first object as a serving side object in a plurality of the objects; a retrieval means for retrieving a second object whose input data type is output data type of the first object from said memory means; and a control means for assigning the second object after the first object as a relay object or a receiving side object.

Further in accordance with the present invention, there is also provided an information processing method in a computer connected to a plurality of application equipment, a memory in the computer stores, by unit of object corresponding to the application equipment, input data type applicable in each object, and output data type supplied to other object, comprising the steps of: indicating a first object as a serving side object and a second object as a receiving side object in a plurality of the objects; retrieving a third object whose input data type is output data type of the first object and output data type is input data type of the second object from said memory, if the output data type of the first object is different from the input data type of the second object; and assigning the third object between the first object and the second object as a relay object.

Further in accordance with the present invention, there is also provided an information processing method in a computer connected to a plurality of application equipment, a memory in the computer stores, by unit of object corresponding to the application equipment, input data type applicable in each object, and output data type supplied to other object, comprising the steps of: indicating a first object as a serving side object in a plurality of the objects; retrieving a second object whose input data type is output data type of the first object from said memory means; and assigning the second object after the first object as a relay object or a receiving side object.

Further in accordance with the present invention, there is also provided a computer readable memory containing computer readable instructions in a computer connected to a plurality of application equipment, comprising: an instruction means for causing a computer to store, by unit of object corresponding to the application equipment, the input data type applicable in each object and output data type supplied to the other object; an instruction means for causing a computer to indicate a first object as a serving side object and a second object as a receiving side object in a plurality of the objects; an instruction means for causing a computer to retrieve a third object whose input data type is output data type of the first object and output data type is input data type of the second object from said memory, if the output data type of the first object is different from the input data type of the second object; and an instruction means for causing a computer to assign the third object between the first object and the second object as a relay object.

Further in accordance with the present invention, there is also provided a computer readable memory containing computer readable instructions in a computer connected to a plurality of application equipment, comprising: an instruction means for causing a computer to store, by unit of object corresponding to the application equipment, the input data type applicable in each object and output data type supplied to other object; an instruction means for causing a computer to indicate a first object as a serving side object in a plurality of the objects; instruction means for causing a computer to retrieve a second object whose input data type is the output data type of the first object from said memory means; and an instruction means for causing a computer to assign the second object after the first object as a relay object or a receiving side object.

BRIEF DESCRIPTION OF THE DRAWINGS

FIG. 3 is a schematic diagram of the content of a database in a memory section of the information processing apparatus in FIG. 2.

FIG. 4 is a schematic diagram of the content of the definition table to recognize character code in the database of FIG. 3.

FIG. 7 is a schematic diagram of the content of a new object registered in the database in FIG. 3.

DETAILED DESCRIPTION OF THE PREFERRED EMBODIMENTS

The present invention is explained by referring to the Figures. First, terms used in following explanation are defined. An object is a single logical or physical unit including one or plural functions and data. A function is a processing function or data itself in the object. For example, the function may be a command to call the processing function or the data in the object. It is called an active function. The active function may be a pointer to a memory area in which the processing program is stored, or a pointer to memory area in which the processing data is stored. In short, by operating the active function to the object, one function of the object is executed or the processing data of the object is transferred to another object.

Figure 1:
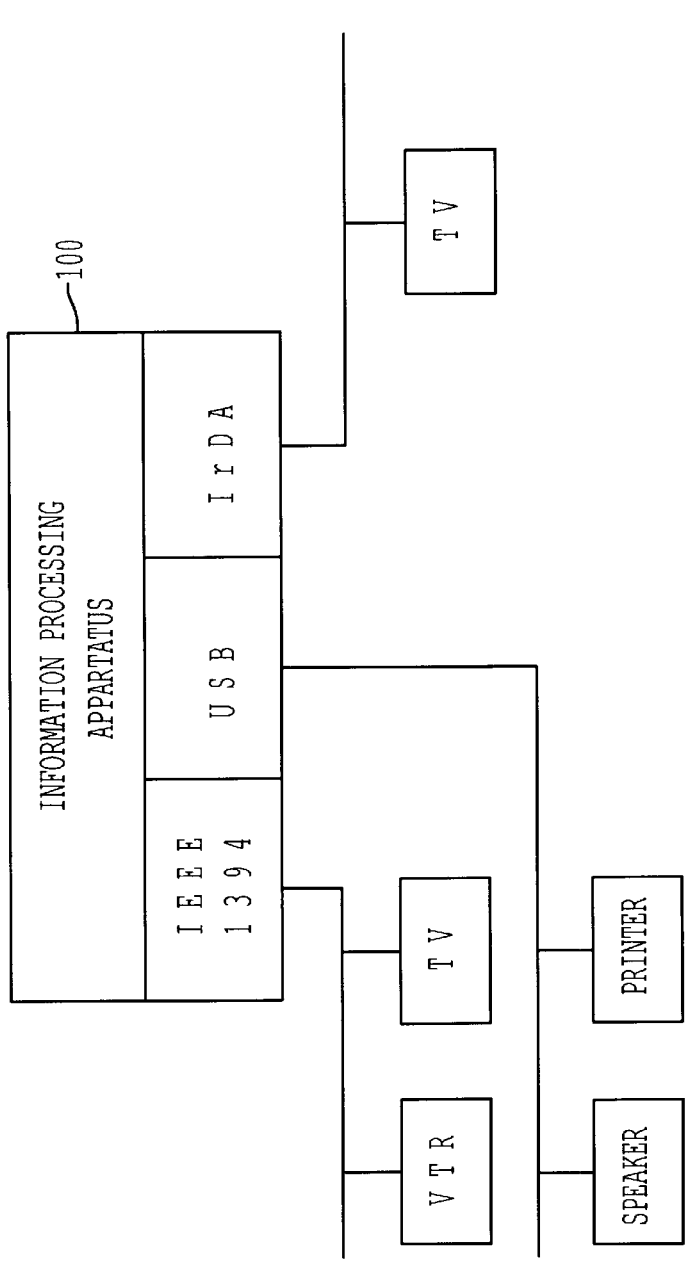
FIG. 1 is a block diagram of a network system including the information processing apparatus of the present invention.

FIG. 1 is a block diagram of the network system including the information processing apparatus 100 of the present invention connected to a TV, VTR, printer, and speaker. The information processing apparatus 100 recognizes the TV, VTR, printer, and speaker as the object, and corresponds one object with another object in response to the user's indication. A processing function of the object is executed through predetermined interface (IEEE 1394, USB, IrDA). For example, the TV or the printer, as the real body of the object, is accessed and video data of the TV is outputted through the printer.

Figure 2:
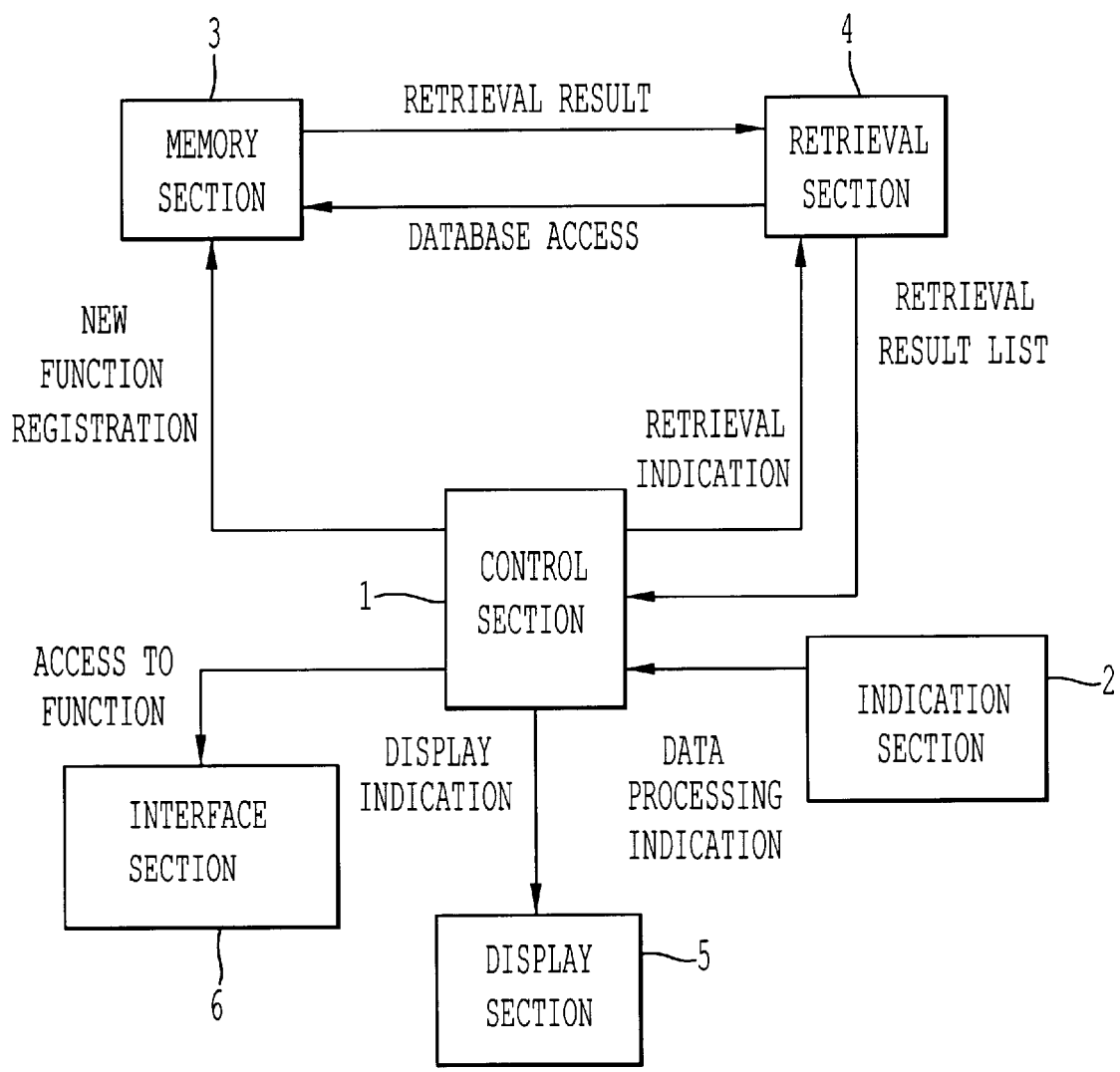
FIG. 2 is a block diagram of the information processing apparatus according to the present invention.

FIG. 2 is a block diagram of the information processing apparatus of the present invention, consisting of a control section 1, an indication section 2, a memory section 3, a retrieval section 4, a display section 5, and an interface section 6. The indication section 2 is, for example, a pointing device for the user to select a desired object or to input other indication data. The memory section 3 stores a database in which a group of functions (including the processing of data) of each object is described by predetermined format.

As shown in FIG. 3, the database of the memory section 3 previously registers the object identifier (ID) managed by the information processing apparatus 100, the active function belonging to each object, and an abstract function name representing each active function. An input data type and an output data type are registered by unit of the active function. (In case the function is processing data, the data type is registered.) Additionally, the cost based on processing time of the active function or precision of the processing data is registered. The object ID is necessary to identify the object in the system of FIG. 1 and is represented as a character code to be retrieved by the retrieval section 4. The object ID is uniquely assigned to each object such as company ID, product ID, program name. In short, the object is uniquely indicated by the object ID. The active function in each object is registered as the abstract function name of the character code. The active function to be actually called is registered as pointer data in a field of the active function. In order to be retrieved by the retrieval section 4, the character code is respectively registered in the input data type area and the output data type area as the data type to input to the active function and the data type to output from the active function. Furthermore, based on the execution time of the active function, the cost value is set. The shorter the execution time is, the smaller the cost value is.

In the memory section 3, except for the database in FIG. 3, a definition table to recognize the character code of the data type in the database is stored as shown in FIG. 4. As a large classification, type names are defined as "DOCUMENT", "SOUND", "STILL IMAGE", "DYNAMIC IMAGE", "VIDEO", "AUDIO". As a sub-classification, various format names are defined as shown in FIG. 4.

Figure 5:
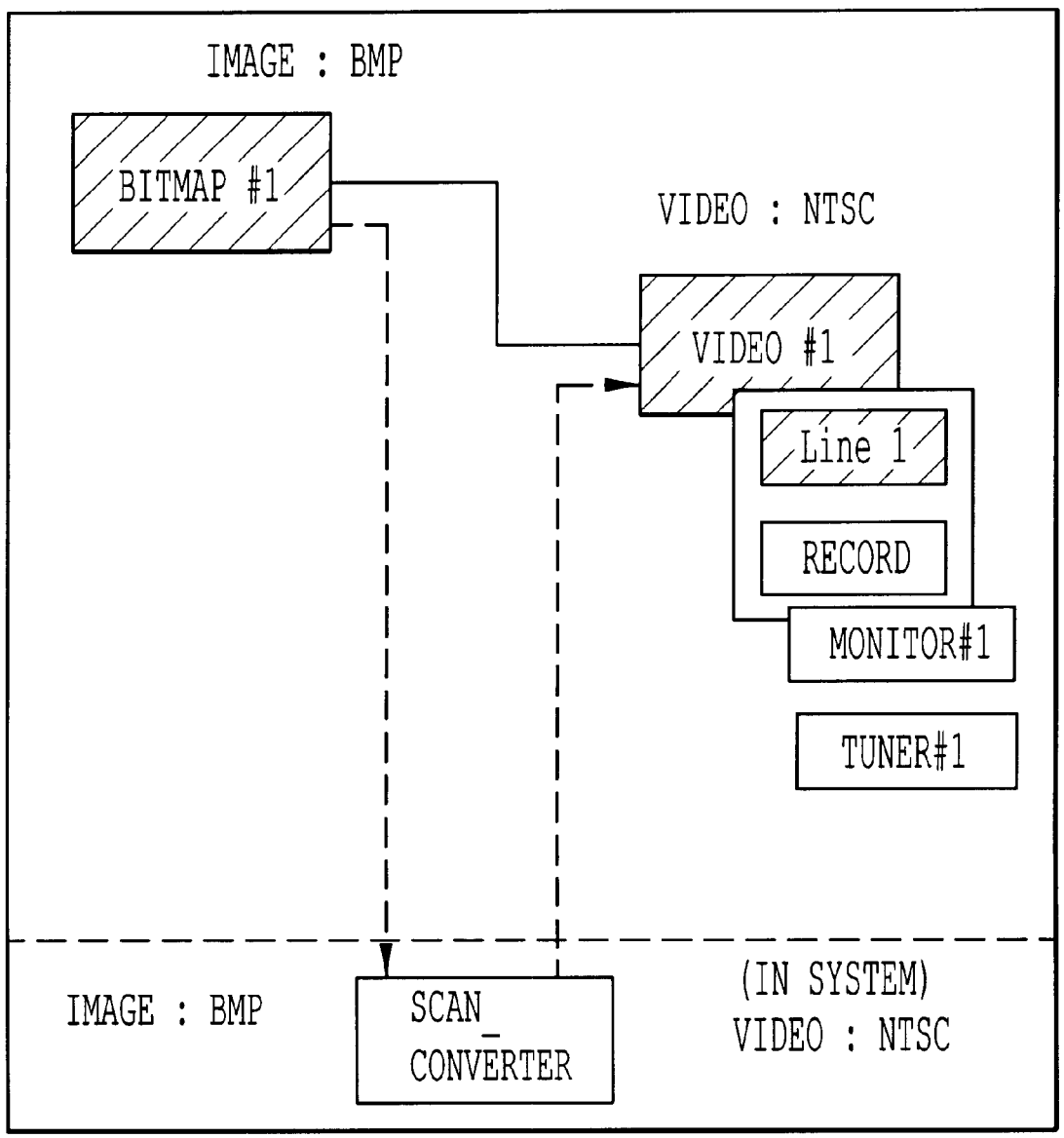
FIG. 5 is an example of a selected object and retrieval result in a display section according to the first embodiment of the present invention.

The input data type and the output data type in FIG. 3 are respectively represented as a combination of the type name and the format name. The retrieval section 4 retrieves the character code in the database of FIG. 3. This retrieval area is respectively indicated as the object ID, the abstract function name, the input data type, the output data type. The display section 5 displays the operational objects to be managed by the information processing apparatus 100, and the transmission status of the data between the objects. The user selects the object to be processed through the indication section 2 while he is looking the content on the display section 5. The user may select the object through a remote-controller. In this case, by using the remote-controller including a three-dimensional posture sensor, the equipment as the object is identified by special position data. When the user selects the desired equipment, the selected equipment may inform the user as an operational object through voice, or may urge the user to confirm a connection destination. For example, in case the data is transferred between two objects, two objects selected by the indication section 2 are inversely displayed as shown in FIG. 5. In short, when two objects are selected on the display section 5, the data transmission between the two objects is indicated. In this case, the two objects to which the data transmission is succeeded may be linked by a line as shown in FIG. 5 and the two objects to which the data transmission is failed may be displayed as error.

The interface section 6 includes various kinds of interfaces such as IEEE 1394, USB, IrDA and accesses the active function existing in each object. The control section 1 controls each section, executes correspondence between a plurality of the objects indicated by the indication section 2 (sets a path to transmit data between the plurality of the objects), and executes the matching of the data type to transmit between the objects. As a method to select the object, for example, the user's desired object is selected from a plurality of the objects on the display section 5, or the user's desired abstract function name is selected from a plurality of the abstract function names on the display section 5.

Figure 6:
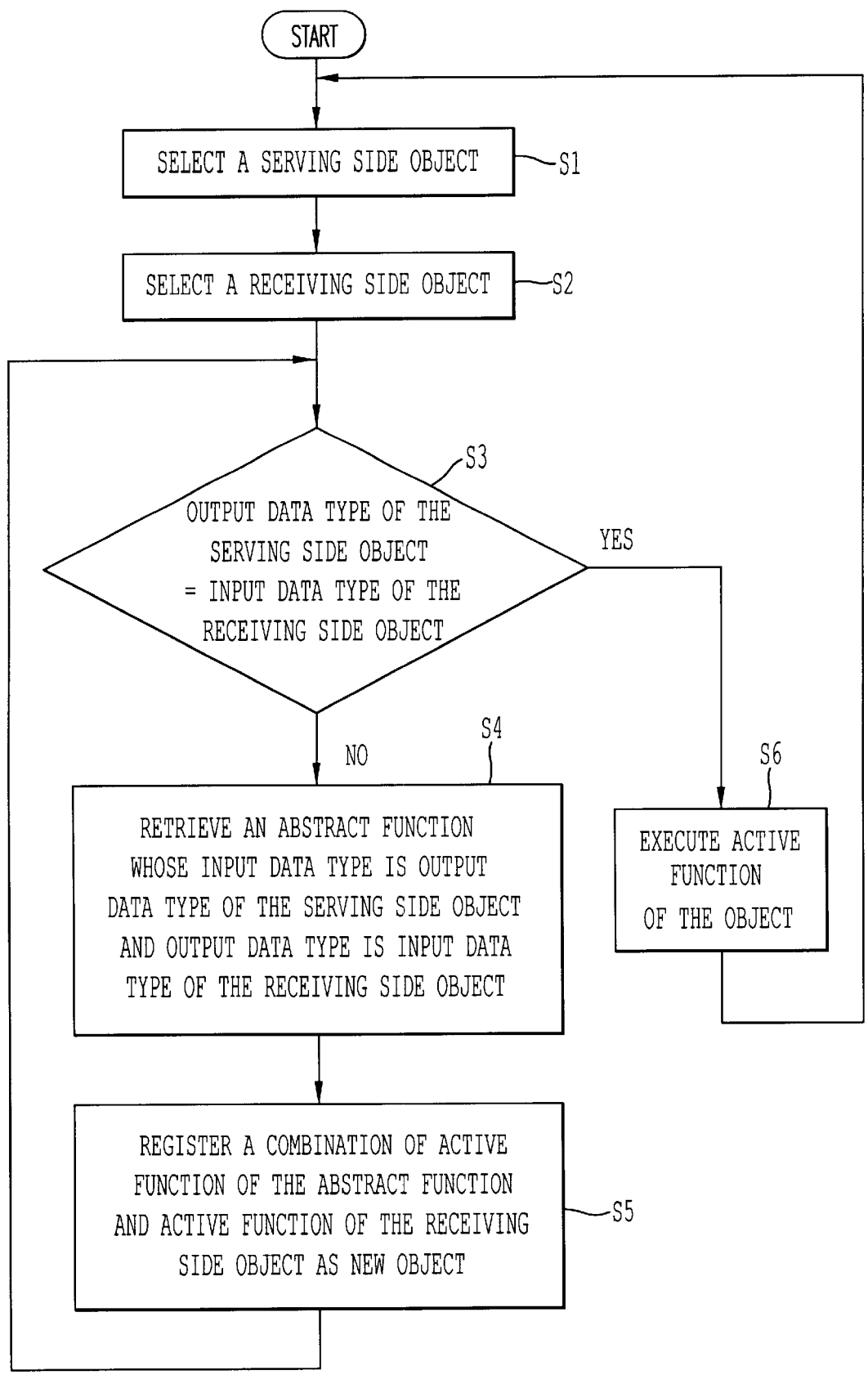
FIG. 6 is a flow chart of the processing of the information processing method according to the first embodiment of the present invention.

FIG. 6 is a flow chart of the processing of the information processing apparatus according to a first embodiment of the present invention. As an example, assume that bitmap image data as a first object is displayed on a video player as a second object. First, the user indicates the bitmap image as a data serving object and the video player as a data receiving object. For example, as shown in FIG. 5, an icon "BITMAP #1" representing bitmap image data is selected by the indication section 2 (S1). This bitmap image data is previously created by predetermined application software. In this case, the icon "BITMAP #1" is inversely displayed. This display status informs the user of the object to be selected as the data serving object as shown in FIG. 5. Next, in same way, an icon "VIDEO #1" representing the video player is selected by the indication section 2 (S2). In this case, the icon "VIDEO #1" is inversely displayed. This display status also informs the user of the object to be selected as the data receiving object as shown in FIG. 5. The active function of the object "VIDEO #1" is previously registered in the memory section 3 as shown in FIG. 3. The control section 1 outputs a retrieval indication to the retrieval section 4. In this case, the icon "VIDEO #1" is selected as the data receiving object. Therefore, the retrieval section 4 retrieves the abstract function name of which the input data type is character code from all the abstract function names of "VIDEO #1" in the memory section 3. This retrieval result is displayed on the display section 5 through the control section 1. In case a plurality of the abstract function names is retrieved, they may be displayed in order of lowest cost on the display section 5. In the case of FIG. 3, the abstract function name "Record" and "Line 1" of the object ID "VIDEO #1" are displayed as shown in FIG. 5. If one abstract function name "Line 1" is selected by the indication section 2, the control section 1 outputs the retrieval indication to the retrieval section 4. The retrieval section 4 retrieves the active function of the abstract function name "Line 1" from the memory section 3 and sends the active function to the control section 1. In the case of FIG. 3, the following active function is retrieved.

\* Video #1: on; \* Video #1: line 1

The control section 1 accesses the object "VIDEO #1" by this active function through the interface section 6 and indicates execution of the active function. In this case, the object "VIDEO #1" turns on and waits for an input signal from the external input line 1.

Next, the processed data of the serving side object "BITMAP #1" is transferred to the receiving side object "VIDEO #1". As shown in FIG. 3, the output data type of the object ID "BITMAP #1" is "IMAGE: BMP" (still image: bitmap) and the input data type of the object ID "VIDEO #1" is "VIDEO: NTSC" (video: NTSC standard). In short, the output data type of the serving side object is different from the input data type of the receiving side object, and data transmission from the serving side object to the receiving side object is impossible in this format (S3). Therefore, the control section 1 outputs the retrieval indication to the retrieval section 4. By using the output data type "IMAGE: BMP" as a keyword, the retrieval section 4 retrieves the object ID whose input data type is "IMAGE: BMP" from the memory section 3. In FIG. 3, as the object ID of data conversion function candidate, three objects ID "SCAN_

CONVERTER" "IMGVIEW #1" "IMGEDIT #1" are retrieved. On the other hand, the input data type of the data receiving side object "VIDEO #1" is "VIDEO: NTSC". Therefore, the retrieval section 4 further retrieves the object ID or the abstract function name whose output data type is "VIDEO: NTSC" from the three object IDs. In this case, the abstract function name "transform" of the object ID "SCAN_CONVERTER" is selected as the data conversion function and displayed on the display section 5 (S4).

In this way, bitmap image data "BITMAP #1" of the serving side object is converted to an NTSC video signal by the active function "transform" of the object "SCAN_CONVERTER", and the NTSC video signal is transferred to the receiving side object "VIDEO #1". A combination of the active functions for the above data conversion is represented as follows.

* ScanConv: transform; * Video #1: line 1

By executing the above active functions, the processed data "BITMAP #1" is actually displayed on the object "VIDEO #1". For example, if the user indicates execution of the active function through the indication section 2, the control section 1 accesses the object by the active function and indicates the execution of the active function through the interface section 6 (S6).

As for the combination of the active functions "* ScanConv: transform; * Video #1: line 1", the control section 1 creates a table of which the abstract function name and the object ID are respectively "BMP_VIDEO" as shown in FIG. 7, and registers this table in the memory section 3 (S5). The cost of the newly created function may be the sum of the cost predetermined by the corresponding functions in FIG. 3. For example, in FIG. 3, the cost of the abstract function name "transform" of the object ID "SCAN_CONVERTER" is "1" and the cost of the abstract function name "Line 1" of the object ID "VIDEO #1" is "5". Therefore, the cost of the new abstract function name "BMP_VIDEO" is "6". When the table in FIG. 7 is registered in the memory section 3, this table is used hereafter by the retrieval section 4. In short, when the processed data represented by the character code "IMAGE: BMP" is displayed by the object "VIDEO #1", the retrieval section 4 immediately retrieves the object ID "BMP_VIDEO", of which the input data type is "IMAGE: BMP" and the output data type "VIDEO: NTSC". Therefore, the above-mentioned retrieval processing of the data conversion function is omitted.

Figure 8:
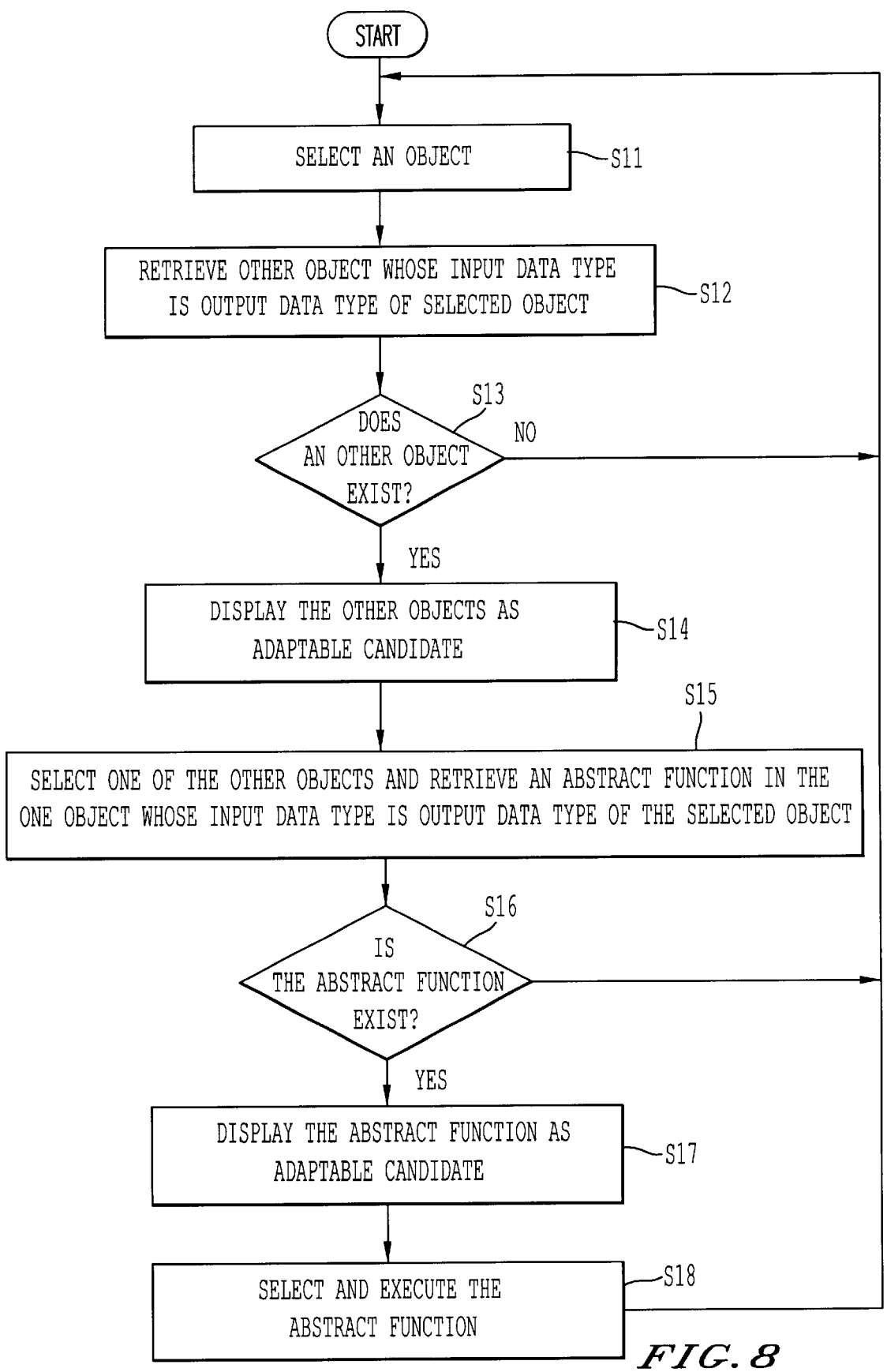
FIG. 8 is a flow chart of the processing of the information processing method according to a second embodiment of the present invention.
Figure 9:
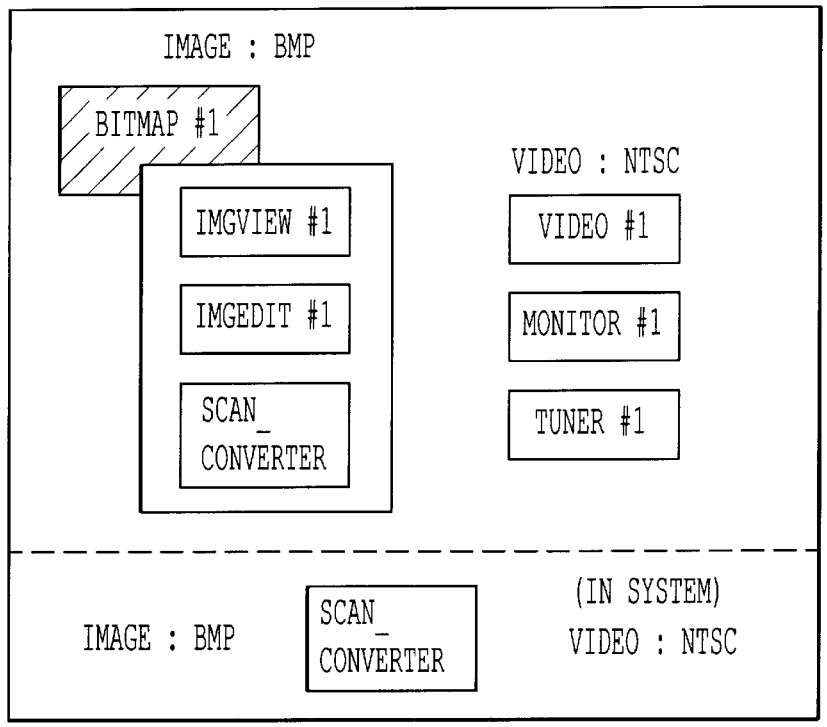
FIG. 9 is an example of the selected object and retrieval result in the display section according to the second embodiment of the present invention.
Figure 10:
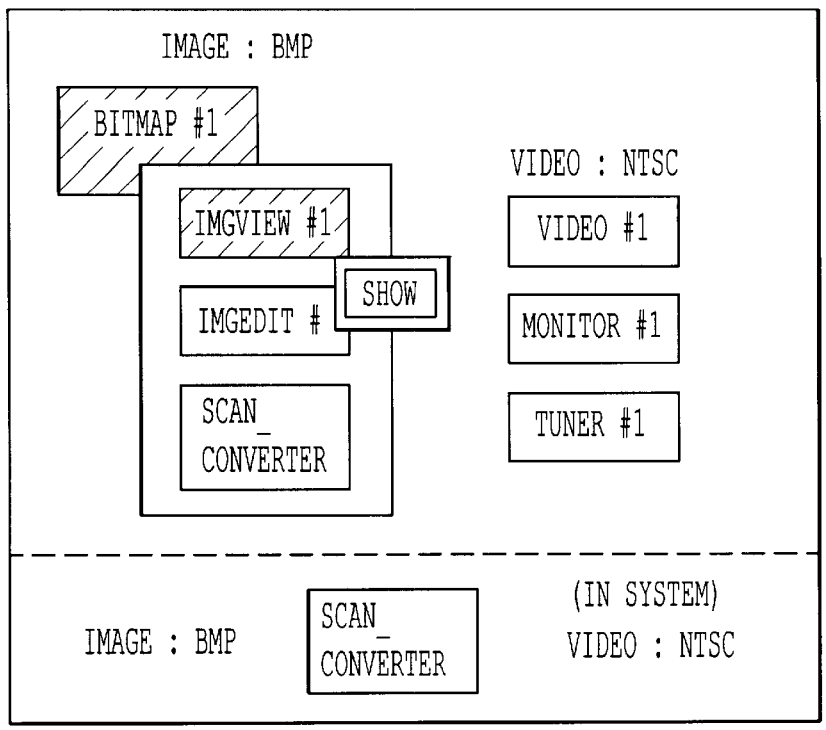
FIG. 10 is an example of a selected object and retrieval result including an abstract function name in the display section according to the second embodiment of the present invention.

Next, FIG. 8 is a flow chart of the processing of the information processing apparatus according to a second embodiment of the present invention. As an example of the second embodiment, if the bitmap image data as the object is indicated by the user, a list of objects to which the bitmap image data is applicable is displayed. In short, when the data serving side object is indicated by the user, another object to process the data from the indicated object is automatically retrieved based on the list. First, an icon "BITMAP #1" on the display section 5 is selected by the indication section 2 as shown in FIG. 9 (S11). The output data type of the object "BITMAP #1" is "IMAGE: BMP" as shown in FIG. 3. Therefore, in response to the retrieval indication from the control section 1, the retrieval section 4 retrieves the other object whose input data type is "IMAGE: BMP" from the memory section 3 (S12). This retrieval result is sent to the display section 5 as a list of applicable object candidates. In this case, as shown in FIG. 9, the object "IMGVIEW #1" including an image display function, the object "IMGEDIT #1" including an image editing function, and the object "SCAN_CONVERTER" including a data conversion function, are displayed (S13, S14). When the user selects one object from these three objects through the indication section 2, the retrieval section 4 retrieves the abstract function name whose input data type is "IMAGE: BMP" in the selected object (S15). This retrieval result is displayed on the display section 5 as a list of applicable active function candidates (S16, S17). For example, if the object "IMGVIEW #1" is selected in FIG. 9, the retrieval section 4 retrieves the abstract function name "show" whose input data type is "IMAGE: BMP" from all abstract function names of the object "IMGVIEW #1" stored in the memory section 3. The retrieved abstract function name "show" is displayed on the display section 10 as shown in FIG. 10. If the user selects one of the abstract function names on the display section 10 (in FIG. 10, only one abstract function name "show" is displayed), the control section 1 accesses the object by the selected active function and indicates execution of the active function through the interface section 6 (S18). For example, as shown in FIG. 10, when the abstract function name "show" is selected, the active function "* Img View #1: show" is executed. The processing data of the object "BITMAP #1" is read by the program of the object "IMGVIEW #1" and displayed on the display section 5.

Figure 11:
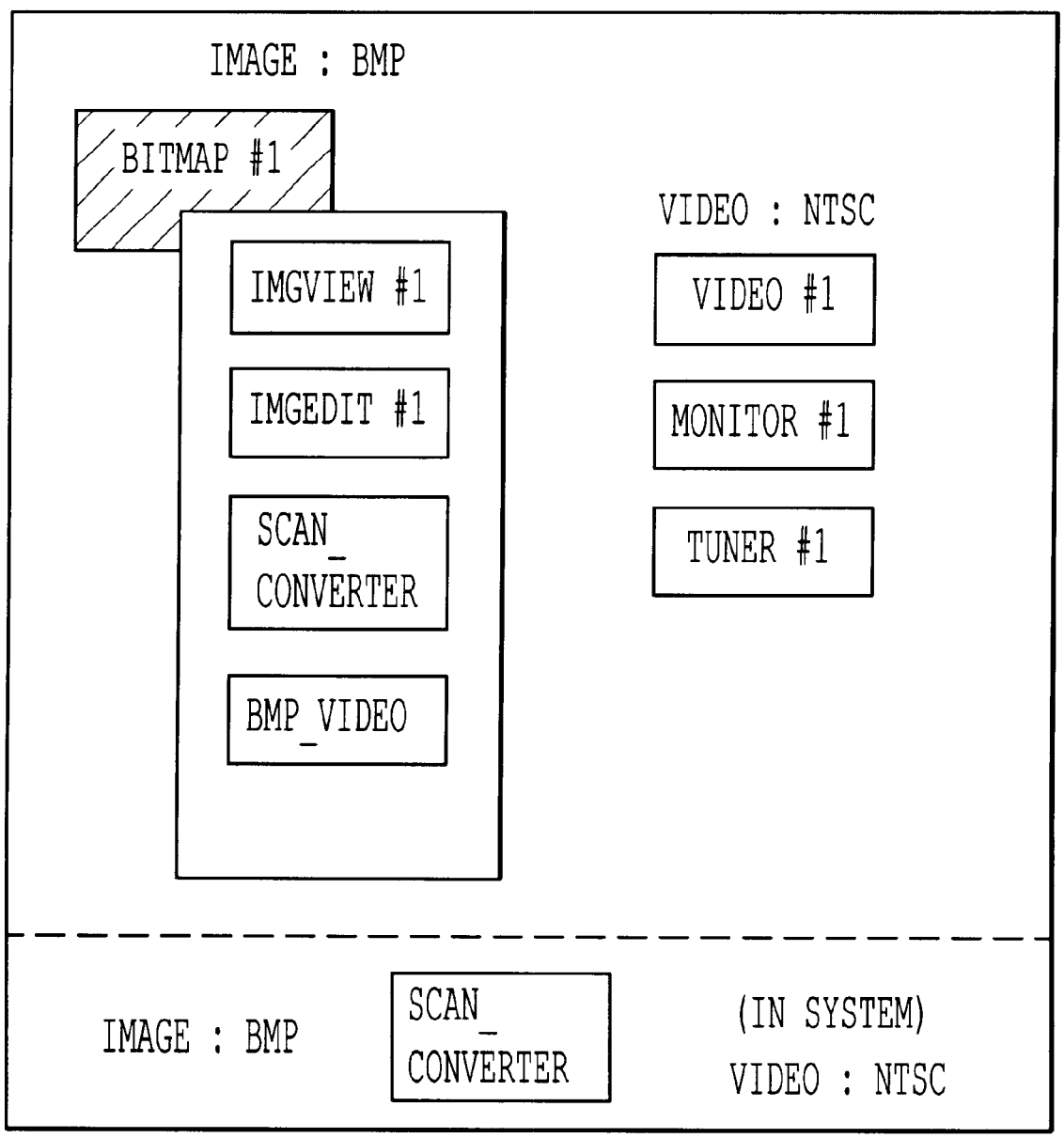
FIG. 11 is another example of selected object and retrieval result in the display section according to the second embodiment of the present invention.

Next, assume that the table (new object) in FIG. 7 is registered in the data base at step S5 of FIG. 6 and the processing in the flow chart of FIG. 8 is executed. In this case, the input data type of the new object is "IMAGE: BMP" as shown in FIG. 7. Therefore, this object ID "BMP_VIDEO" is also displayed in the display section 5 at step S14 of FIG. 8. As shown in FIG. 11, the new object ID "BMP_VIDEO" is displayed as the applicable object candidate to be selected.

A memory can be used to store instructions for performing the process described above, such a memory can be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An information processing apparatus connected to a plurality of application devices, comprising:

memory means for storing an input data type and an output data type relative to an object, each of the plurality of application devices having a corresponding object;

indication means for indicating a first object as a serving side object and a second object as a receiving side object from each object;

retrieval means for retrieving a third object having the same input data type as the output data type of the first object and the same output data type as the input data type of the second object from each object stored in said memory means, if the output data type of the first object is different from the input data type of the second object; and control means for assigning the third object between the first object and the second object as a relay object.

2. The information processing apparatus according to claim 1, wherein said memory means stores an active function as a processing program in each object, an abstract function name representing the active function, and a cost representing an execution time of the active function.

3. The information processing apparatus according to claim 2, wherein said control means transmits a signal from the first object to the third object, the signal being processed by the active function of the third object, and transmits the processed signal from the third object to the second object.

4. The information processing apparatus according to claim 2, wherein the input data type, the output data type, the active function, the abstract function name, and the cost are character codes commonly used by the information processing apparatus and the plurality of application devices.

5. The information processing apparatus according to claim 2, further comprising display means for displaying a plurality of abstract function names of the first object or the second object, if the first object or the second object includes the plurality of abstract function names in said memory means.

6. The information processing apparatus according to claim 2, wherein said control means registers the input data type of the third object, the output data type of the second object, a combination of the active function of the third object and the active function of the second object as an active function of a new object, and an abstract function name representing the active function of the new object in said memory means.

7. The information processing apparatus according to claim 6, wherein said retrieval means retrieves the active function of the new object in accordance with the output data type of the first object, the output data type of the second object and the abstract function name of the new object from said memory means.

8. The information processing apparatus according to claim 1, wherein said retrieval means does not retrieve the third object from said memory means, if the output data type of the first object is the same as the input data type of the second object, and wherein said control means transmits a signal from the first object to the second object, the signal being processed by the active function of the second object.

9. The information processing apparatus according to claim 1, wherein the input data type and the output data type are respectively represented as a combination of data type name and data format name.

10. An information processing apparatus connected to a plurality of application devices, comprising:

memory means for storing an input data type and an output data type relative to an object, each of the plurality of application devices having a corresponding object;

indication means for indicating a first object as a serving side object from each object;

retrieval means for retrieving a second object having the same input data type as the output data type of the first object from each object stored in said memory means; and control means for assigning the second object as a relay object of the first object or a receiving side object.

11. The information processing apparatus according to claim 10, wherein said memory means stores an active function as a processing program in each object, an abstract function name representing the active function, and a cost representing an execution time of the active function.

12. The information processing apparatus according to claim 11, further comprising display means for displaying a plurality of second objects in cost order, if the plurality of second objects are retrieved by said retrieval means.

13. The information processing apparatus according to claim 12, wherein said retrieval means retrieves, if one of the second objects is selected by said indication means, the abstract function name of the selected second object from said memory means.

14. The information processing apparatus according to claim 13, wherein said display means displays a plurality of abstract function names of the selected second object in cost order, if the plurality of abstract function names of the selected second object are retrieved by said retrieval means.

15. The information processing apparatus according to claim 14, wherein said control means, if one of the plurality of abstract function names is selected by said indication means, transmits a signal from the first object to the selected second object, the signal being processed by the active function of the selected abstract function name of the selected second object.

16. The information processing apparatus according to claim 11, wherein the input data type, the output data type, the active function, the abstract function name, and the cost are character codes commonly used by the information processing apparatus and the plurality of application devices.

17. The information processing apparatus according to claim 10, wherein the input data type and the output data type are respectively represented as a combination of data type name and data format name.

18. An information processing method in a computer connected to a plurality of application devices, wherein a memory in the computer stores an input data and an output data type relative to an object, each of the plurality of application devices having a corresponding object, comprising the steps of:

indicating a first object as a serving side object and a second object as a receiving side object from each object;

retrieving a third object having the same input data type as the output data type of the first object and the same output data type as the input data type of the second object from each object stored in said memory, if the output data type of the first object is different from the input data type of the second object; and assigning the third object between the first object and the second object as a relay object.

19. An information processing method in a computer connected to a plurality of application devices, wherein a memory in the computer stores an input data type and an output data type relative to an object, each of the plurality of application devices having a corresponding object, comprising the steps of:
- indicating a first object as a serving side object from each object;
- retrieving a second object having the same input data type as the output data type of the first object from each object stored in said memory; and
- assigning the second object as a relay object of the first object or a receiving side object.

20. A computer readable memory containing computer readable instructions in a computer connected to a plurality of application devices, comprising:
- instruction means for causing a computer to store an input data type and an output data type relative to an object, each of the plurality of application devices having a corresponding object;
- instruction means for causing a computer to indicate a first object as a serving side object and a second object as a receiving side object from each object;
- instruction means for causing a computer to retrieve a third object having the same input data type as the output data type of the first object and the same output data type as the input data type of the second object from each object, if the output data type of the first object is different from the input data type of the second object; and
- instruction means for causing a computer to assign the third object between the first object and the second object as a relay object.

21. A computer readable memory containing computer readable instructions in a computer connected to a plurality of application devices, comprising:
- instruction means for causing a computer to store an input data type and an output data type relative to an object, each of the plurality of application devices having a corresponding object;
- instruction means for causing a computer to indicate a first object as a serving side object from each object;
- instruction means for causing a computer to retrieve a second object having the same input data type as the output data type of the first object from each object; and
- instruction means for causing a computer to assign the second object as a relay object of the first object or a receiving side object.

22. An information processing apparatus connected to a plurality of application devices, comprising:
- a memory configured to store an input data type and an output data type relative to an object, each of the plurality of application devices having a corresponding object;
- an indication unit configured to indicate a first object as a serving side object and a second object as a receiving side object from each object;
- a retrieval unit configured to retrieve a third object having the same input data type as the output data type of the first object and the same output data type as the input data type of the second object from each object stored in said memory, if the output data type of the first object is different from the input data type of the second object; and
- a control unit configured to assign the third object between the first object and the second object as a relay object.

23. An information processing apparatus connected to a plurality of application devices, comprising:
- a memory configured to store an input data type and an output data type relative to an object, each of the plurality of application devices having a corresponding object;
- an indication unit configured to indicate a first object as a serving side object from each object;
- a retrieval unit configured to retrieve a second object having the same input data type as the output data type of the first object from each object stored in said memory; and
- a control unit configured to assign the second object as a relay object of the first object or a receiving side object.

* * * * *